(12) United States Patent
Henley et al.

(10) Patent No.: US 7,063,562 B2
(45) Date of Patent: Jun. 20, 2006

(54) SEAT POWER OUTLETS INTEGRATED INTO FLOOR

(75) Inventors: James T Henley, Seattle, WA (US);
Forrest Frantz, North Bend, WA (US);
Martin Grether, Bothell, WA (US)

(73) Assignee: The Boeing Company, Chicago, IL (US)

( * ) Notice: Subject to any disclaimer, the term of this patent is extended or adjusted under 35 U.S.C. 154(b) by 28 days.

(21) Appl. No.: 10/921,553

(22) Filed: Aug. 19, 2004

(65) Prior Publication Data

US 2006/0038070 A1    Feb. 23, 2006

(51) Int. Cl.
*H01R 11/00* (2006.01)

(52) U.S. Cl. .......................................... 439/502; 439/34

(58) Field of Classification Search .................. 439/34, 439/502, 550, 544–545, 535, 214–215; 174/48; 280/422; D13/139.4
See application file for complete search history.

(56) References Cited

U.S. PATENT DOCUMENTS

| | | | | |
|---|---|---|---|---|
| 3,553,675 | A | * | 1/1971 | Shaver et al. ............... 455/41.2 |
| 3,873,177 | A | * | 3/1975 | Ross ............................ 439/368 |
| 4,365,775 | A | | 12/1982 | Glancy |
| 4,428,078 | A | | 1/1984 | Kuo |
| 4,763,360 | A | | 8/1988 | Daniels et al. |
| 4,825,648 | A | | 5/1989 | Adamson |
| 4,835,604 | A | * | 5/1989 | Kondo et al. .................. 725/76 |
| 4,853,555 | A | | 8/1989 | Wheat |
| 5,273,393 | A | | 12/1993 | Jones et al. |
| 5,524,847 | A | | 6/1996 | Brodell et al. |
| 5,984,415 | A | * | 11/1999 | Schumacher et al. .... 297/411.2 |
| 6,038,426 | A | * | 3/2000 | Williams, Jr. ................. 725/77 |
| 6,173,807 | B1 | | 1/2001 | Welch et al. |
| 6,227,485 | B1 | | 5/2001 | Porte |
| 6,601,798 | B1 | | 8/2003 | Cawley |
| 6,604,355 | B1 | | 8/2003 | Sternberger |

(Continued)

FOREIGN PATENT DOCUMENTS

GB         2265418        9/1993

*Primary Examiner*—Hae Moon Hyeon
(74) *Attorney, Agent, or Firm*—Harness Dickey & Pierce P.L.C.

(57) ABSTRACT

A cabling system and method for providing access to electrical power and/or data communications onboard a mobile platform is provided. A plurality of lower connectors are attached to a bottom side of a plurality of mobile platform floor panels. Each lower connector includes at least one lower connector coupling contact that is connected to a lower connector signal conduit. The lower connector signal conduits convey either electrical signals or data signals between each lower connector coupling contact and a signal source and/or a signal receiver. A plurality of upper connectors removably mate with the lower connectors. Each upper connector includes at least one upper connector coupling contact that removably couples with the lower connector coupling contact(s) of the mated lower connector. A plurality of upper connector signal conduits are connected to the upper connector coupling contacts and detachably connect to at least one user connection port and/or at least one seat electrical unit (SEU) accessible by a passenger seated in a passenger cabin of the mobile platform. Thus, a transmission path for the electrical and/or data signals is provided between the lower connectors and the user connection ports and/or the SEU's when the upper connectors are mated with the lower connectors.

40 Claims, 7 Drawing Sheets

U.S. PATENT DOCUMENTS

| | | | |
|---|---|---|---|
| 6,674,000 B1 * | 1/2004 | Lambiaso | 174/50 |
| 6,725,542 B1 | 4/2004 | Maguire | |
| 6,808,413 B1 * | 10/2004 | Plant et al. | 439/527 |
| 6,875,916 B1 * | 4/2005 | Winkelbach et al. | 174/48 |
| 6,899,390 B1 * | 5/2005 | Sanfrod et al. | 279/217.4 |
| 2005/0021602 A1 * | 1/2005 | Noel et al. | 709/203 |

* cited by examiner

SEAT POWER OUTLETS INTEGRATED INTO FLOOR

FIELD OF INVENTION

The invention relates generally to power and/or data distribution within a mobile platform. More particularly, the invention relates to a mobile platform wiring system integrated with floor panels by being attached to a bottom side of the floor panels.

BACKGROUND OF THE INVENTION

More and more, commercial mobile platforms, such as aircrafts, ships, trains and buses, are being equipped to meet the ever increasing passenger demand for in-transit entertainment and electrical power outlets to operate various electronic devices, such as laptop computers, at their seats. To provide the passenger with such features, electrical power and data must be delivered to each seat. Typically, power and data are delivered to passenger seats via numerous cables that typically run between the passenger seats above the floor. These cables generally have many connectors, which are highly variable depending upon the particular positional layout of the passenger seats, i.e. seat pitch. Many unique part numbers are required for these cables, which makes the custom-made cables expensive to purchase.

Additionally, cables carrying power and/or data between the seats and a power and/or data source are difficult to install, maintain, and replace. Generally, the cables are laid out in groups/bundles on the floor of the passenger cabin, and the seat groups are carried in over the exposed cables and fastened to the top side of the passenger cabin floor panels. A portion of the cables are typically positioned beneath a covering, such as the seat track cover. Another portion, that includes connectors to seat electronics units (SEU), generally located under the seats, is left exposed to connect with the yet to be installed seat groups. Taking care to avoid the exposed wires increases both the complexity of the operation and the amount of time required to install the seats. Mechanics then have to crawl along the floor making multiple individual connections to join the bundles together and to join the individual bundles to the SEU's or other equipment in the seats. This makes these cables expensive to install and replace.

Furthermore, in order to change the configuration of the seats or to replace the seats, the mechanics must again crawl along the floor, disconnect the wiring from each seat or seat group, and maneuver the seats around the exposed wiring. Still further, in order to change the position of the seat groups, the mobile platform must be re-wired so that the wiring will reach the seats in their new positions. These procedures for reconfiguring and re-wiring a mobile platform are costly and time consuming procedures.

Therefore, it is desirable to eliminate cables with unique part numbers, reduce the number of connectors to approximately one per seat group and reduce, preferably eliminate, the re-engineering required when seat pitch is altered.

BRIEF SUMMARY OF THE INVENTION

A cabling system and method for providing access to electrical power and/or data communications onboard a mobile platform is provided in accordance with a preferred embodiment of the present invention. Data communication can include such things a video entertainment data, onboard educational data and data from Internet links. The system includes a plurality of lower connectors that are attached to a plurality of mobile platform floor panels. Particularly, selected floor panels, preferably each floor panel, have at least one of the lower connectors attached to a bottom side of the respective floor panel. Each lower connector includes at least one lower connector coupling contact, e.g. either a male contact or a female receptor or a combination of the two. A plurality of lower connector signal conduits, e.g. electrical wire or optical fiber, are connected to the lower connector coupling contacts and linked together such that the lower connectors are linked together. The lower connector signal conduits convey either electrical signals and/or data signals between each lower connector coupling contact and a signal source and/or a signal receiver.

Generally, the electrical signals comprise electrical current for providing electrical power at user connection ports and/or seat electronics units (SEU). The user connection ports and SEUs are located to be accessible by passengers seated in the passenger cabin to provide electrical power for such things as a laptop computer. Each user connection port and SEU is associated with one of a plurality of passenger seat groups located adjacent a top side of the floor panels. The data signals generally comprise electrical data signals and/or optical data signals that provide the passengers with access to information, data and entertainment provided by a mobile platform onboard server, e.g. an onboard local area network (LAN).

The system additionally includes a plurality of upper connectors that removably mate with the lower connectors. Each upper connector includes at least one upper connector coupling contact, e.g. either a male contact or a female receptor or a combination of the two. The upper connector coupling contact(s) removably couple(s) with the lower connector coupling contact(s) of the mated lower connector. A plurality of upper connector signal conduits, e.g. electrical wire or optical fiber, are connected to the upper connector coupling contacts. Each upper connector signal conduit is connected at one end to the upper connector coupling contact of one upper connector. The opposing end of each upper connector signal conduit is detachably connectable to at least one user connection port and/or SEU to thereby provide a transmission path for the electrical and/or data signals between the lower connectors and the user connection ports and/or the SEUs when the upper connectors are mated with the lower connectors.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1A:
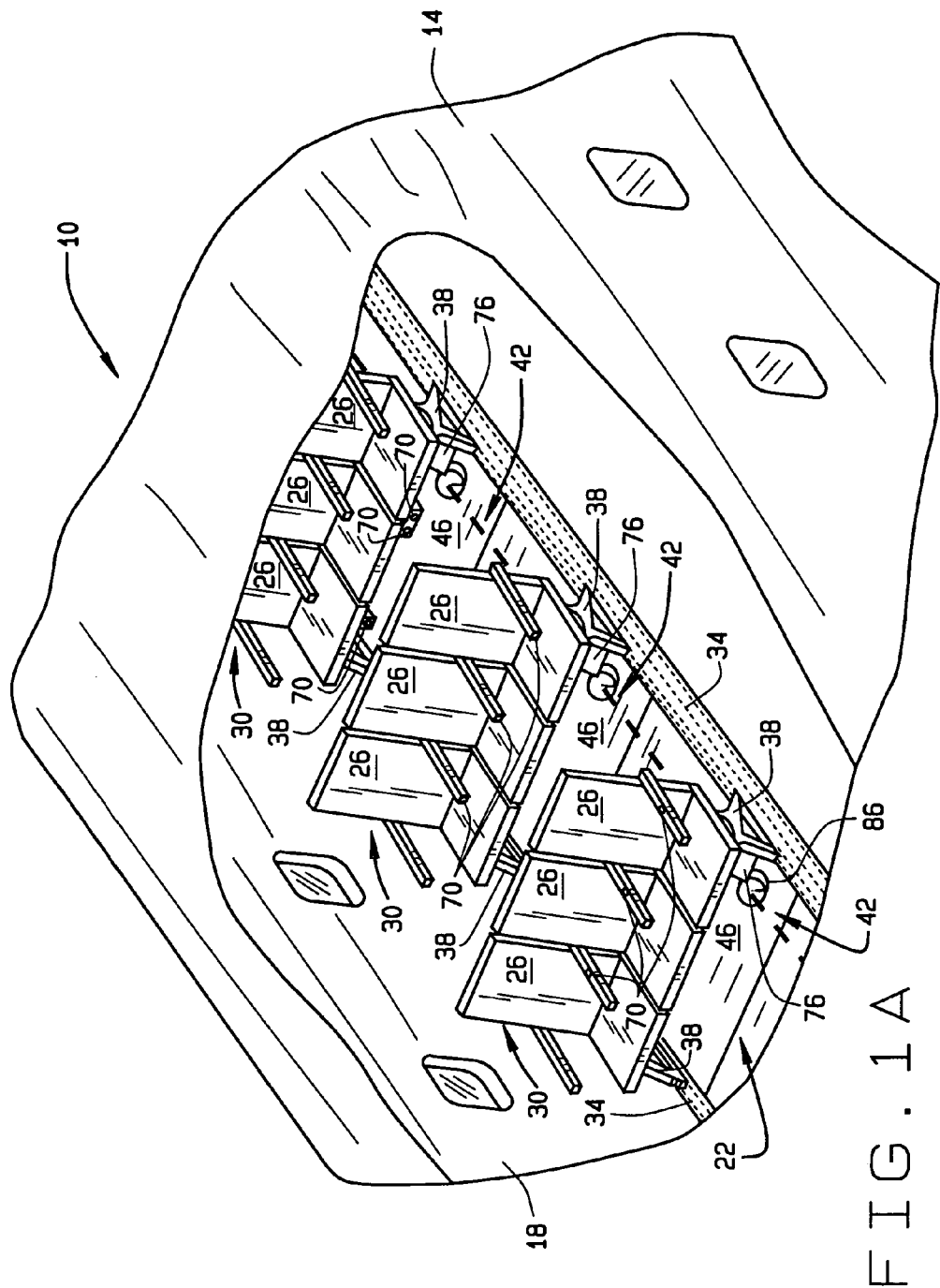
FIG. 1A is a partially cut-away view of a mobile platform showing the mobile platform passenger cabin outfitted with the power and/or data distribution system of the present invention.
Figure 1B:
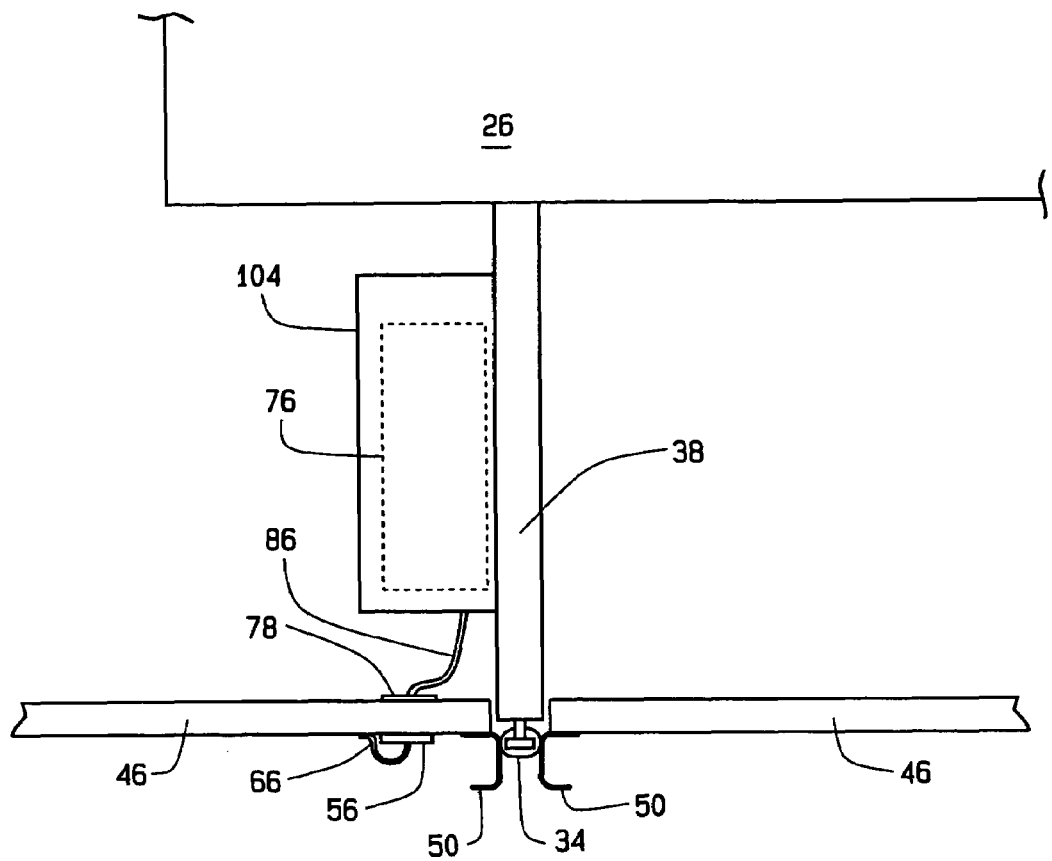
FIG. 1B is a sectional view of a seat and cabling system integrated with a floor panel shown in FIG. 1A.

With initial reference to FIG. 1A, a mobile platform 10 equipped with a power and/or data distribution system according to the present invention is illustrated. It will be appreciated that the mobile platform 10 can be any form of mobile platform, such as an aircraft, ship, train or bus. The mobile platform 10 generally includes a fuselage 14 enclosing a passenger cabin 18 having a floor 22. At the floor 22 are numerous passenger seats 26. Two or more passenger seats 26 are grouped together as a seat group 30. One or more seat tracks 34 extend along the floor 22 to secure the seat groups 30 into position. Each seat group 30 includes at least a pair of legs 38 that are mounted to seat tracks 34 and provide support to the different passenger seats 26.

A cabling system, in accordance with a preferred embodiment of the present invention is generally indicated at 42. The cabling system 42 is utilized to deliver electrical power and/or data communications to the seat groups 30 to thereby make such electrical power and/or data communications available to passengers occupying any seat 26.

Referring now to FIGS. 1A, 1B, 2A, 2B and 2C, the passenger cabin floor 22 is comprised of a plurality of floor panels 46 that are supported by seat track flanges 50. The seat tracks 34 are connected to the seat track flanges 50 to support the seats 26 adjacent a top side 54 of the floor panels 46. The cabling system 42 includes a plurality of lower connectors 56 attached a bottom side 58 of the floor panels 46. In a preferred embodiment, each floor panel 46 has at least one lower connector 56 attached thereto. Alternatively, as described below, each floor panel 46 can have more than one lower connector 56 attached to the bottom side 58. Each lower connector 56 includes at least one lower connector coupling contact 62. A plurality of lower connector signal conduits 66 are connected to the lower connector coupling contacts 62 and linked together such that the lower connectors 56 are linked together. The lower connector signal conduits 66 convey electrical signals and/or data signals between each lower connector 56 and a signal source and/or a signal receiver (not shown).

Figure 2A:
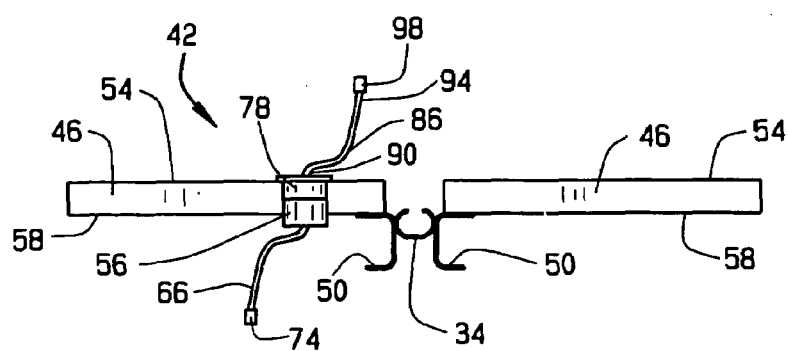
FIG. 2A is a sectional view of the cabling system integrated with a floor panel shown in FIG. 1B.
Figure 2B:
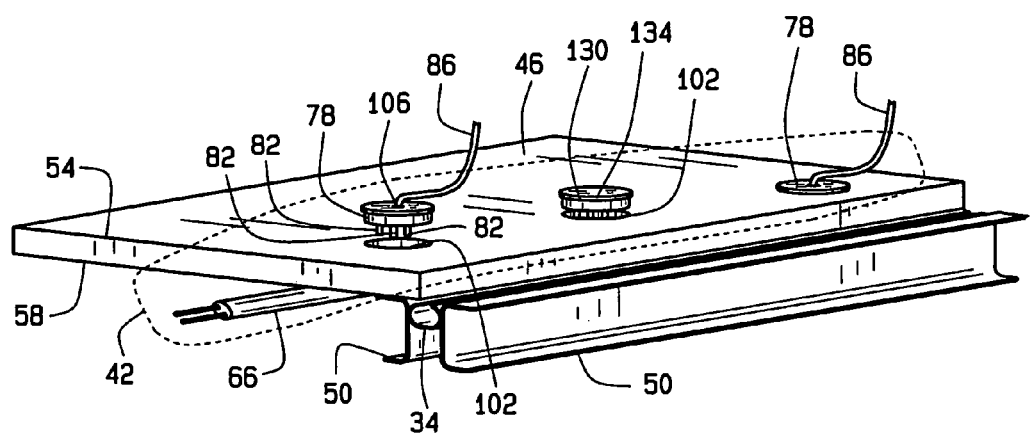
FIG. 2B is an isometric top view of the cabling system integrated with the floor panel shown in FIG. 2A.
Figure 2C:
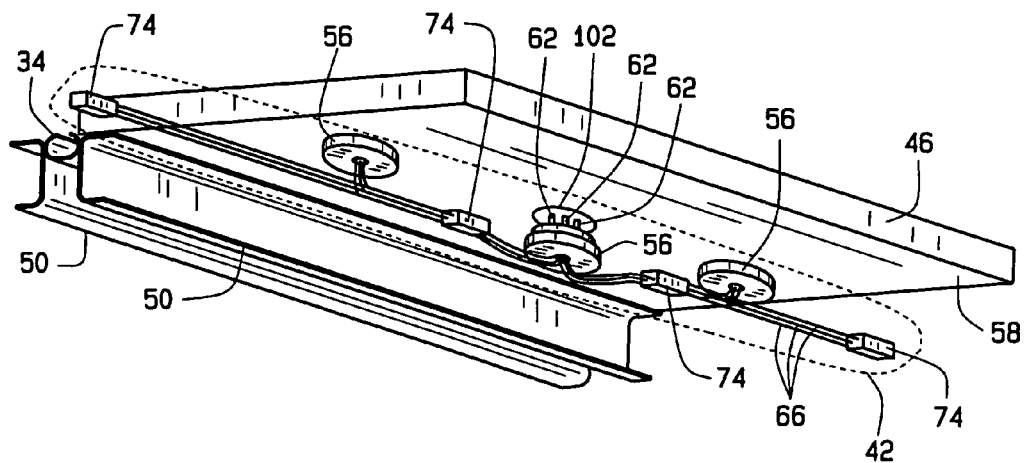
FIG. 2C is an isometric bottom view of the cabling system integrated with the floor panel shown in FIG. 2A.

The lower connector signal conduits 66 can be a single signal carrying conduit (FIG. 2A), e.g., a wire or optical fiber, a plurality of signal carrying conduits bundled together to form a single cable (FIG. 2B), or a plurality of individual signal carrying conduits (FIG. 2C). In a preferred embodiment, the lower connector signal conduits 66 are detachably coupled together by couplers 74 such that each lower connector can be attached to the bottom side 58 of the floor panels 46 and then subsequently coupled together at couples 74 to link the lower connectors 56. Alternatively, the lower connector signal conduits 66 for two or more lower connectors are substantially permanently coupled together to form lower connector groups that are attached to the bottom side 58 of one or more floor panels 46 and then subsequently coupled together at couplers 74 to link the lower connectors 56.

Generally, the electrical signals comprise electrical current generated by a power source onboard the mobile platform. The electrical signals provide electrical power at a plurality of user connection ports 70 that are accessible by passengers of the mobile platform. The user connection ports 70 provide power for powering passengers' electrical devices and/or provide a connection for the users to access the data signals, as described below. In a preferred embodiment, the electrical signals are also utilized to provide electrical power seat electronic units (SEU's) 76, shown best in FIG. 1B. The SEU's distribute the power to the user connection ports 70 and to other equipment (not shown) that is attached to, or installed in, a seat 26 or seat 30 group. Each user connection port 70 is associated with one of the passenger seat groups 30. For example, the user connection ports 70 can be located on an armrest of each seat 26, below each seat 26, or any other location that is conveniently accessible by passengers seated in the seats 26.

The data signals generally comprise electrical data signals and/or optical data signals that provide the passengers with access to information, data and entertainment provided by a data source, e.g. a server for an onboard local area network (LAN) (not shown). Accordingly, the lower connector signal conduits 66 can be either wire or optical fiber depending on the type of data signal utilized.

A plurality of upper connectors 78 removably mate with the lower connectors 56. Each upper connector 78 includes at least one upper connector coupling contact 82 that removably couples with the lower connector coupling contact(s) 62 when each upper connector 78 is mated with the respective lower connector 56. A plurality of upper connector signal conduits 86, are connected to the upper connector coupling contact(s) 82 such that a first end 90 of each upper connector signal conduit 86 is connected to one upper connector 78. An opposing second end 94 of each upper connector signal conduit 86 is connectable to at least one of the user connection ports 70 or the SEUs 76. This connection provides a transmission path for the signals between the lower connectors 56, i.e., the power and/or data source, and the in-seat equipment and/or the user connection ports 70 when the upper connectors 78 are mated with the lower connectors 56. In a preferred embodiment, the upper connector signal conduits 86 are connectable to the user connection ports 70 via the seat electronics units (SEU) 76, shown in FIG. 1B, that are linked to the user connection ports 70 by appropriate cabling (not shown). Alternatively, the second ends 94 are connected to couplers 98 that can be either substantially directly coupled with the connection ports 70 or coupled with appropriate cabling extending from each connection port 70. In another preferred embodiment, the upper connector signal conduits 86 are a flat cable. Therefore, the flat upper connector signal conduits 86 can be routed under a carpet or other floor panel 46 covering out to the edge of the respective floor panel 46 at which point each upper connector signal conduit 86 is routed up to the related user connection port 70 or SEU 76, as described herein.

With further reference to FIGS. 1, 2A, 2B and 2C, in a preferred embodiment, a plurality of apertures 102 are cut into the floor panels 46 at regular intervals, preferably near the edge of the respective floor panel 46, but with sufficient margin to avoid interference with the seat tracks 34. The apertures 102 are sized to allow the upper and lower connectors 78 and 56 to mate within the aperture, as illustrated in FIG. 2A. The lower connectors 56 are fitted into the apertures 102 from the bottom side 58 of the floor panels 46 and attached to the respective floor panels 46 with appropriate fastening, e.g. fasteners, adhesive, clips, etc. As described above, the lower connectors 56 are linked together on the bottom side 58 of the floor panels 46. In addition to the couplers 74 being used to link the lower connector signal conduits 66, e.g. to jumper between adjacent floor panels 46, the couplers 74 may also be utilized to link one or more of the lower connector signal conduits 66 to other cabling of the mobile platform. For example, the couplers 74 can be used to link the lower connectors signal conduits to an onboard local area network (LAN), an electrical power source, or any other mobile platform amenity provided for passenger access.

The mating upper connectors 78 are installed from above the floor panels 46 and thereby provide connections between the lower connectors 56 and user connection ports 70 such that passengers can access the provided amenities, e.g. electrical power source and/or a data source, while sitting in the seat groups 30. In a preferred implementation, the locations of the seat groups 30 allows the apertures 102 to be positioned so that the upper connectors 78 are located under SEU's 76. Therefore, a housing or shroud 104 of the SEU's 76 provides protection for the upper connectors and signal conduits 78 and 86 to reduce the potential of fluids or moisture dripping or splashing onto the upper connectors and signal conduits 78 and 86. Additionally, the upper connector signal conduits 86 can include a drip loop, i.e. be looped, to further reduce the potential of fluid or moisture penetrating the upper connectors 78. Likewise, the lower connector signal conduits 66 can include drip loops to minimize the potential for liquids or moisture from penetrating the lower connectors 56.

Figure 3A:
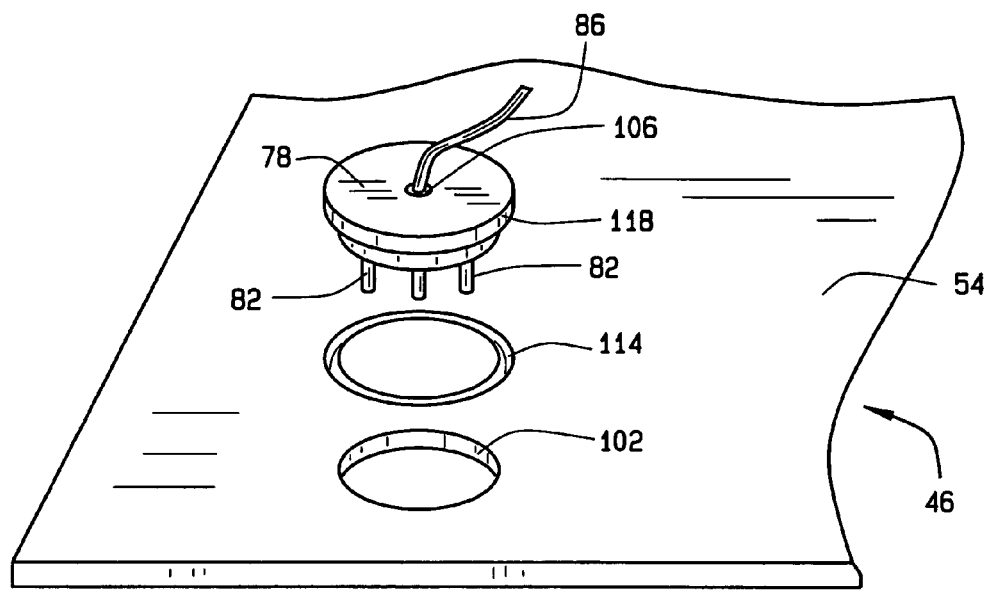
FIG. 3A is an isometric top view illustrating fluid penetration safeguards for an upper connector shown in FIGS. 2A and 2B.
Figure 3B:
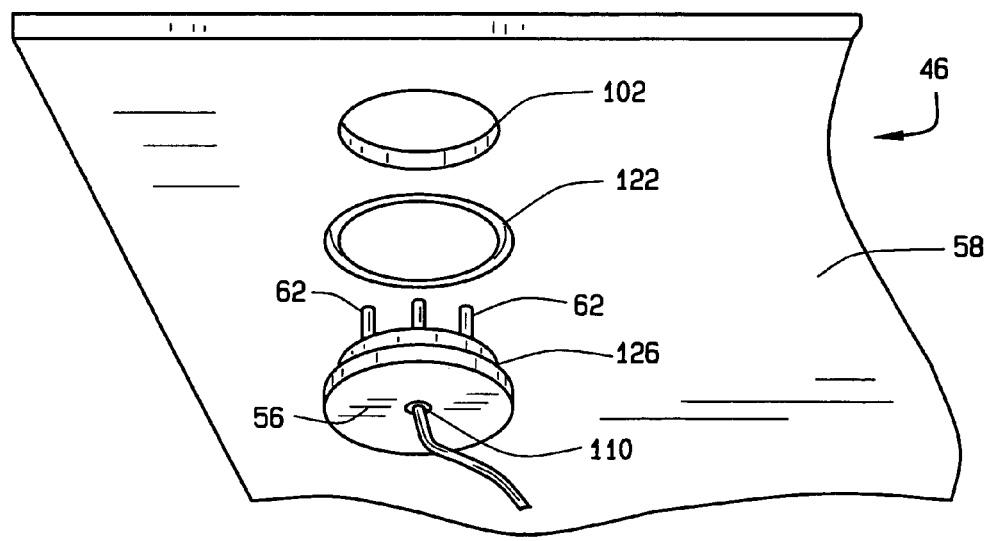
FIG. 3B is an isometric bottom view illustrating fluid penetration safeguards for a lower connector shown in FIGS. 2A and 2C.
Figure 3C:
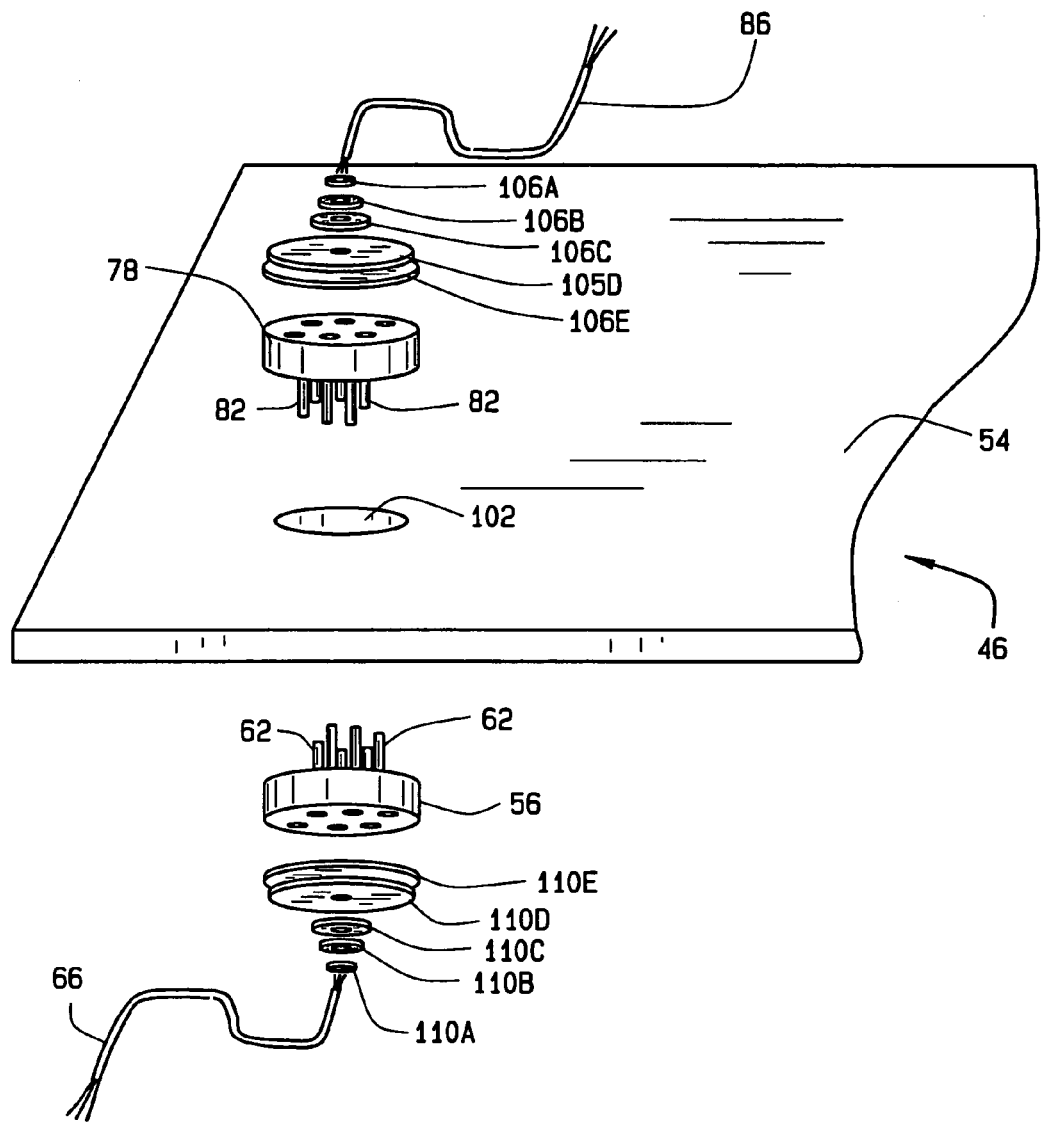
FIG. 3C is an isometric view of the cabling system shown in FIG. 1, illustrating alternative fluid penetration safeguards for the upper and lower connectors shown in FIGS. 2A, 2B and 2C.

Referring to FIGS. 3A and 3B, in another preferred embodiment, additional safeguards against fluids moving along the upper and/or lower connector signal conduits 86 and/or 66 into the related connectors 78 and/or 56 are provided. For example, an upper connector moisture seal 106 and/or a lower connector moisture seal 110 are installed around the respective signal conduits 86 and/or 66 where the signal conduits 86 and 66 enter the respective connectors 78 and 56. The moisture seals 106 and 110 seal access holes in the upper and lower connectors that allow the respective signal conduits 86 and 66 to connect to the respective coupling contacts 82 and 62, thereby inhibiting moisture from seeping into the connectors 78 and 56. The moisture seals 106 and 110 can be any suitable moisture seal, for example, a plastic, rubber or silicone gasket or O-ring. In a preferred implementation, shown in FIG. 3C, the moistures seals 106 and 110 include a plurality of O-rings or gaskets, e.g. O-rings 106A through 106E and 110A through 110E. Alternatively, the O-rings 106A through 106E and 110A through 110E are constructed as a single piece to from a flexible, protective cover that extends to the edge of the respective upper and/or lower connectors 78 and 56

As a further example, the upper connectors 78 include an upper O-ring 114 that fits under an upper connector flange 118 such that the upper 0-ring 114 forms a moisture resistant seal between the upper connector flange 118 and the floor panel top side 54 when the upper connector 78 is attached to the floor panel 46. Similarly, the lower connectors 56 can include a lower 0-ring 122 that fits above a lower connector flange 126 such that the lower 0-ring 122 forms a moisture resistant seal between the lower connector flange 126 and the bottom side 58 when the lower connector 56 is attached to the floor panel 46. Furthermore, the upper and lower connector flanges 118 and 126 extend beyond the edge of the apertures 102 to further deflect moisture from seeping into the mated upper and lower connectors 78 and 56. As a still further example, the 0-ring 114 fits between the upper and lower connectors 78 and 56 to form a moisture seal.

Referring again to FIGS. 1, 2A, 2B and 2C, the floor panels 46 are fabricated to include a number of apertures 102 that are spaced an equal distance apart so the cabling system 42 can be implemented for any spacing and arrangement of the seat groups 30, i.e. seat pitch. Therefore, there may be occasions where the seat pitch does not require each aperture 102 to have a lower connector 56 and/or a mating upper connector 78 connected therethrough. In this instance, an aperture cover 130, FIG. 2B, is placed in the unused aperture 102 or attached to the top side 54 over the unused aperture 102 and/or the unused lower connector 56. Each aperture cover 130 does not have an upper connector signal conduit 86 extending from a back side 134 and the back side 134 is solid. Additionally, the aperture cover 130 may include a flange similar to the upper connector flange 118 that extends beyond the edge of the unused aperture 102. Each aperture cover 130 has similar dimensions as the upper connectors 78, so that it attaches to the top side 54 of the floor panel 46 in the same manner as the upper connectors 78.

Figure 4A:
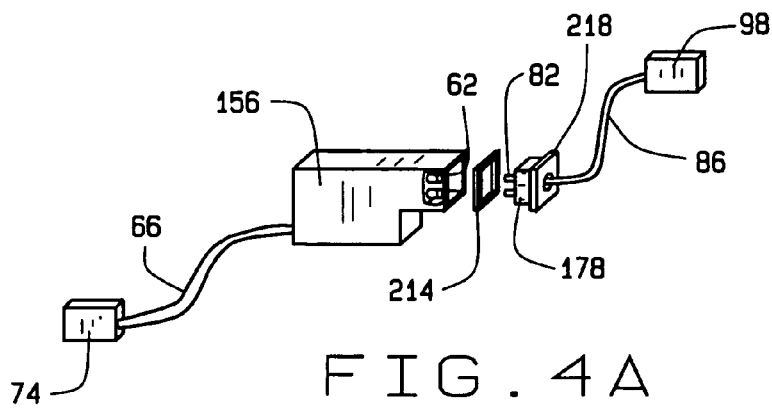
FIG. 4A is an isometric view an alternative embodiment of an upper and lower connector of the cabling system of the present invention, shown in FIGS. 2A, 2B and 2C.
Figure 4B:
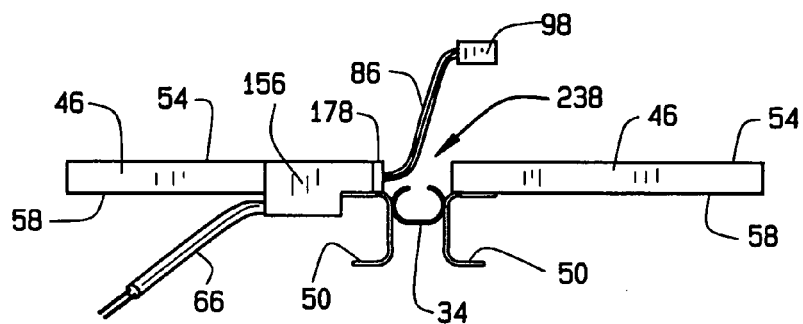
FIG. 4B is a sectional view of the cabling system of the present invention implementing the upper and lower connectors shown in FIG. 4A.
Figure 4C:
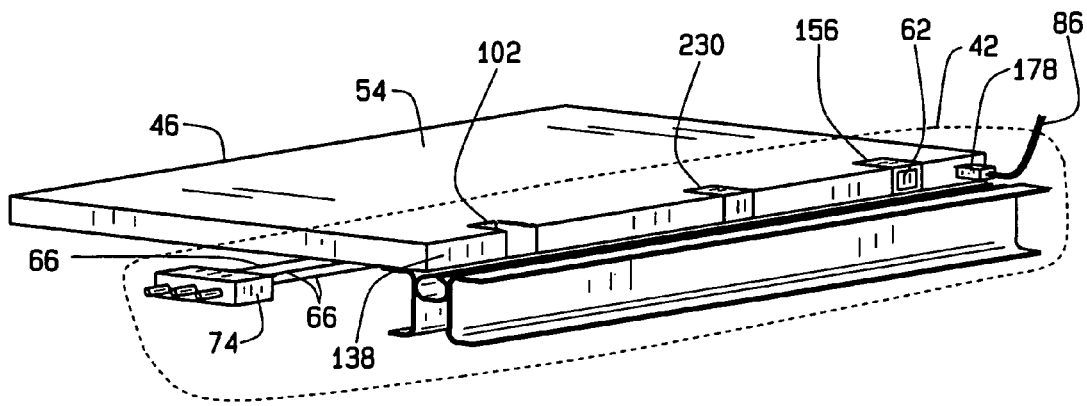
FIG. 4C is an isometric top view of the cabling system of the present invention integrated with the floor panel shown in FIG. 4B.

Referring now to FIGS. 4A, 4B and 4C, an alternate preferred embodiment of the cabling system 42 is illustrated. For convenience and clarity, components illustrated in FIGS. 4A, 4B and 4C identical to components illustrated in FIGS. 2A, 2B and 2C are identified in FIGS. 4A, 4B and 4C with the same reference numerals. In this embodiment, the apertures 102 are located along an edge 138 of the floor panels 46. The apertures 102 are located at regular intervals along the edge 138 and each aperture 102 is sized to allow the insertion of one of a plurality of lower connectors 156. The lower connectors 156 are linked together by lower connector signal conduits, as described above with reference to FIGS. 2A, 2B and 2C. Each lower connector 156 attaches to the bottom side 58 of the respective floor panel 46 such that at least a portion of the lower connector 156 extends into the respective aperture 102. The lower connectors 156 are fitted into the apertures 102 from the bottom side of the floor panel 46 and attached to the floor panel 46 with any suitable fastening device, e.g. adhesive, fasteners, clips, etc.

As described above, with reference to lower connectors 56, the lower connectors 156 are linked together via the lower connector signal conduits 66 and the couplers 74, on the bottom side 58 of the floor panels 46. Additionally, the lower connectors 156 can be linked to other cabling of the mobile platform, via the couplers 74, as described above. A plurality of upper connectors 178 mate with the lower connectors 156 at a side of the respective lower connector 156 that is coplanar with the edge 138 of the respective floor panel 46. When the upper and lower connectors 178 and 156 are mated together, the upper and lower connecting contacts 82 and 62 couple together to thereby allow the transmission of the power and/or data signals between the power and/or data source and the user connection ports 70. As described above, based on the seat pitch of the seat groups 30, not all apertures 102 and/or lower connectors 156 will have an associated lower connector 156 attached thereto. In which case, an aperture cover 230 will be inserted into the unused aperture 102 and/or lower connector 156 and appropriately attached to the floor panel 46 and/or the lower connector 156.

Although this embodiment has less natural issues with moisture seeping into the mated upper and lower connectors 178 and 156, the apertures 102 are equally spaced such that mated upper and lower connectors 178 and 156 for any seat group 30 will be positioned under the SEU shroud of the related seat group 30. Thus, the potential for fluids dripping or splashing onto the upper connector signal conduits 86 and seeping into the upper connector 178 is reduced. Various preferred embodiments include additional safeguards against fluid moving along the upper connector signal conduits 86 and penetrating the upper connectors 178 as described above. For example, the upper and/or lower connectors 178 and/or 156 may include the moisture seals 106 and 110 around the respective upper and/or lower connector signal conduits 86 and/or 66. Additionally, the upper and lower connector signal conduits 86 and/or 66 may be formed to include drip loops to thereby inhibit moisture from seeping into the connectors 178 and/or 156. Furthermore, in one preferred implementation, the upper connectors 178 include an upper O-ring or gasket 214 that fits between an upper connector flange 218 and the lower connector 156 such that the upper O-ring/gasket 214 forms a moisture resistant seal between the upper connector flange 218 and the lower connector 156.

Figure 5:
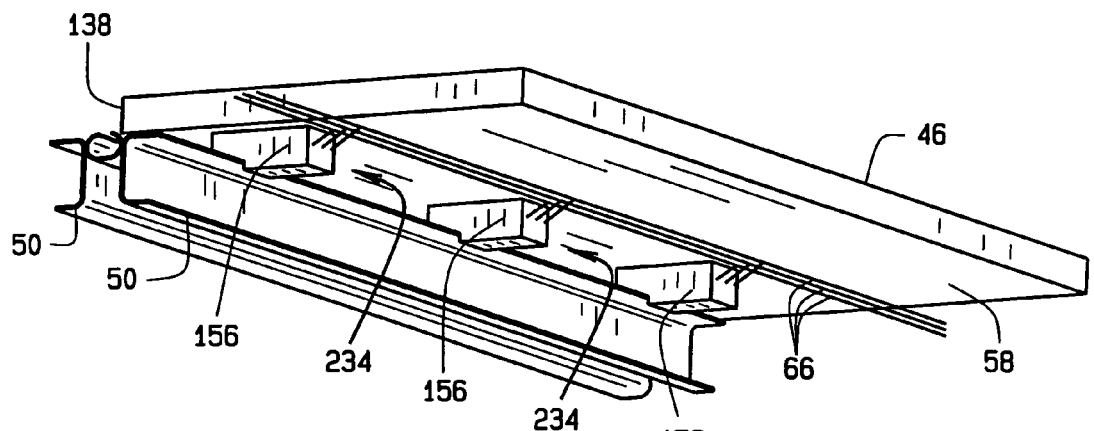
FIG. 5 is an isometric bottom view of the cabling system of the present invention implementing alternative embodiment of the lower connectors shown in FIG. 4A.

Referring to FIG. 5, an alternative embodiment of the lower connectors 156 is illustrated. In this embodiment, the floor panels 46 do not include the apertures 102. The lower connectors 156 attach to the bottom side 58 of the respective floor panel 46 adjacent the edge 138 of the floor panel 46. The upper connectors 178 (shown in FIG. 4A) mate with the lower connectors 156 at a side of the respective lower connector 156 that is coplanar with the edge 138 of the respective floor panel 46. The lower connectors 156 are located in a space or gap 234 between the bottom sides 58 of the floor panels 46 and the seat track flanges 50. Thus, the upper connectors 178 and associated upper connector signal conduits 86 (shown in FIG. 4B) are routed through a seat track space 238 (shown in FIG. 4A) between adjacent floor panels 46 and the gap 234 to mate with the respective lower connectors 156.

Figure 6:
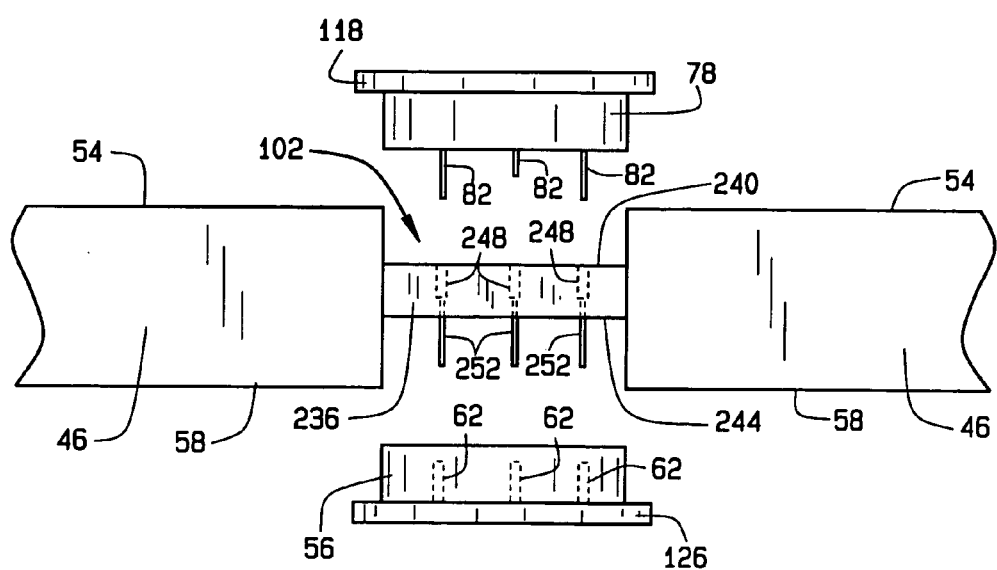
FIG. 6 is an illustration of a connector extension implemented in the cabling system shown in 2A, 2B and 2C, in accordance with an alternate preferred embodiment of the present invention.

Referring now to FIG. 6, a connector extension 236 is illustrated in accordance with a preferred alternate embodiment of the cabling system 42, shown in FIGS. 2A, 2B and 2C. When the floor panels 54 have a thickness such that standardized upper and lower connectors 78 and 56, as described above, do not mate within the aperture 102, the extension 236 can be incorporated. The extension 236 can also act as a sacrificial receptacle removable from above the floor panels 46 for maintenance purposes. The extension 236 is sized to fit within the aperture 102 and have a thickness sufficient to mate with the upper connector 78 at an upper face 240 and mate with the lower connector 56 at a lower face 244. The extension 236 includes at least one upper extension coupling contact 248 and at least one lower extension coupling contact 252 within the extension 236. The upper extension coupling contacts 248 mate with the upper connector extension contacts 82 and the lower extension coupling contacts 252 mate with the lower connector coupling contacts 62 when the upper and lower connectors 78 and 56 are inserted into the aperture 102. The upper and lower extension coupling contacts 248 and 252 are connected within the extension 236 such that a transmission path is provided for the signals between the lower connectors 56, i.e., the power and/or data source, and the user connection ports 70 when the upper connectors 78 are mated with the lower connectors 56 via the extension 236.

Thus, the cabling system 42 provides a cabling system that is integrated with floor panels 46 by having the lower connectors 56 and 156, and associated lower connector signal conduits 66 attached to the bottom side 58 floor panels 46. The lower connectors 56 and 156 mate with the upper connectors 78 and 178 either through an aperture 102 or through a space between the floor panels 46 created by the structure of the seat track flanges 50 or by spacers (not shown) installed at intervals between the floor panels 46 and the seat track flanges 50. Thus, the lower connectors 56 and 156 and associated lower connector signal conduits 66 can be attached to the bottom of the floor panels 46 before or after the seat groups 30 have been mounted in the seat tracks 34. A signal transmission path is then provided for the signals between the power and/or data source and the user connection ports 70 by simply mating the upper connectors 78 with the lower connectors 56. Therefore, ease of installation of the seat groups 30 and power are/or data cabling systems within a mobile platform is greatly improved and the related labor and equipment costs are greatly reduced.

While the invention has been described in terms of various specific embodiments, those skilled in the art will recognize that the invention can be practiced with modification within the spirit and scope of the claims.

What is claimed is:

1. A cabling system for a mobile platform, said system comprising:
   a lower wiring harness including a lower connector attached to a bottom side of a mobile platform floor panel, the lower wiring harness connectable with a second lower wiring harness; and
   an upper wiring harness including an upper connector connectable with the lower connector, the upper wiring harness connectable with a user connection port associated with a passenger seat adjacent a top side of the floor panel to thereby provide a transmission path for at least one of electrical signals and data signals between the lower wiring harness and the user connection port.

2. The system of claim 1, wherein the upper wiring harness is connectable to a seat electronics unit (SEU) that is connected to the user connection port.

3. The system of claim 2, wherein the lower wiring harness comprises:
   the lower connector including at least one lower connector coupling contact; and
   at least one lower signal conduit connected to the lower connector coupling contact for conveying the signals between the lower connector coupling contact and at least one of a signal source and a signal receiver.

4. The system of claim 3, wherein the upper wiring harness comprises:
the upper connector adapted to removably mate with the lower connector, the upper connector includes at least one upper connector coupling contact adapted to removably couple with the lower connector coupling contact when the upper connector is mated with the lower connector; and
at least one upper signal conduit connected to the upper connector coupling contact for conveying the signals between the upper connector coupling contact and at least one of the user connection port and the SEU.

5. The system of claim 4, wherein the lower connector is adapted to attach to the bottom side of the floor panel aligning with an aperture in the floor panel such that the lower connector coupling contact is accessible from the top side of the floor panel.

6. The system of claim 5, wherein the upper connector is adapted to attach to the top side of the floor panel such that the upper connector mates with the lower connector and the upper coupling contact couples with the lower coupling contact through the aperture.

7. The system of claim 1, wherein the lower connector is adapted to:
attach to the bottom side of the floor panel such that at least a portion of the lower connector extends into an aperture located along an edge of the floor panel; and
mate with the upper connector at a side of the lower connector that is coplanar with the edge of the floor panel.

8. The system of claim 1, wherein the lower connector is adapted to:
attach to the bottom side of the floor panel adjacent an edge of the floor panel: and mate with the upper connector at a side of the lower connector that is coplanar with the edge of the floor panel.

9. The system of claim 2, wherein the electrical signals comprise electrical current for providing electrical power to at least one of the user connection port and the SEU.

10. The system of claim 1, wherein the data signals comprise at least one of electrical data signals and optical data signals.

11. A method for providing access to at least one of electrical power and data communications on board a mobile platform, said method comprising:
attaching a plurality of lower connectors to a plurality of mobile platform floor panels such that a bottom side of each floor panel has at least one lower connector attached thereto, each lower connector includes at least one lower connector coupling contact, wherein
each lower connector has a lower connector signal conduit extending from a lower connector back side and connected to the lower connector coupling contact, the lower connector signal conduits are linked together such that the lower connectors are linked together, the lower connector signal conduits convey at least one of electrical signals and data signals between each lower connector coupling contact and at least one of a signal source and a signal receiver; and
removably mating a plurality of upper connectors with the lower connectors, each upper connector includes at least one upper connector coupling contact that removably couples with the lower connector coupling contact when the lower and upper connectors are mated, wherein each upper connector has an upper connector signal conduit extending from an upper connector back side and connected to the upper connector coupling contact, each upper connector signal conduit is connectable to at least one of a user connection port and a seat electrical unit (SEU) associated with one of a plurality of passenger seat groups located adjacent a top side of the floor panels to thereby provide a transmission path for the signals between the lower connectors and the at least one of the user connection port and the SEU of each passenger seat group when the upper connectors are mated with the lower connectors.

12. The method of claim 11, wherein the method further comprises attaching each lower connector to the bottom side of the respective floor panel aligning with an aperture in the respective floor panel such that each lower connector coupling contact is accessible from the top side of the respective floor panel.

13. The method of claim 12, wherein attaching each lower connector comprises attaching each lower connector to the bottom side of the respective floor panel such that at least a portion of each lower connector extends into each respective aperture.

14. The method of claim 12, wherein removably mating the upper connectors with the lower connectors comprises attaching the upper connectors to the top side of the floor panels such that the upper connectors mate with the lower connectors and the upper coupling contacts couple with the lower coupling contacts through the apertures.

15. The method of claim 11, wherein removably mating the upper connectors with the lower connectors comprises providing a barrier against moisture penetrating the mated upper and lower connectors by including a flange around an upper edge of each upper connector.

16. The method of claim 15, wherein providing a barrier against moisture comprises positioning an O-ring under each flange.

17. The method of claim 11, wherein attaching each lower connector comprises:
attaching each lower connector to the bottom side of the respective floor panel such that at least a portion of the lower connector extends into an aperture located along an edge of the respective floor panel; and
mating the lower connectors with the upper connectors at a side of the lower connectors that is coplanar with the edge of the respective floor panels.

18. The method of claim 11, wherein attaching each lower connector comprises:
attaching the lower connectors to the bottom side of the respective floor panel adjacent an edge of the respective floor panel: and
mating the lower connectors with the upper connectors at a side of each lower connector that is coplanar with the edge of the respective floor panel.

19. The method of claim 11, wherein the electrical signals comprise electrical current for providing electrical power to at least one of the user connection ports and the SEUs.

20. The method of claim 11, wherein the data signals comprise at least one of electrical data signals and optical data signals.

21. The method of claim 11, wherein the method further comprises reducing the penetration of moisture into the lower connectors by form drip loops in the lower connector signal conduits between the lower connectors.

22. The method of claim 11, wherein the method further comprises substantially preventing moisture from entering the upper connectors by inserting a moisture seal around an upper conduit access hole in each upper connector.

23. The method of claim 11, wherein the method further comprises substantially preventing moisture from entering the lower connectors by inserting a moisture seal around an lower conduit access hole in each lower connector.

24. A signal distribution system for a mobile platform, said system comprising:
a plurality of lower connectors attached to a plurality of mobile platform floor panels such that a bottom side of each floor panel has at least one lower connector attached thereto, each lower connector comprises at least one lower connector coupling contact;
a plurality of lower connector signal conduits connected to the lower connector coupling contacts and linked together such that the lower connectors are linked together, the lower connector signal conduits are adapted to convey at least one of electrical signals and data signals between each lower connector coupling contact and at least one of a signal source and a signal receiver;
a plurality of upper connectors adapted to removably mate with the lower connectors, each upper connector comprises at least one upper connector coupling contact adapted to removably couple with the lower connector coupling contact of the mated lower connector; and
a plurality of upper connector signal conduits, each upper connector signal conduit connected to the upper connector coupling contact of one upper connector and connectable to at least one of:
at least one user connection port, and
at least one seat electronics unit (SEU),
wherein, the connection port and the SEU are associated with one of a plurality of passenger seat groups located adjacent a top side of the floor panels to thereby provide a transmission path for the signals between the lower connectors and at least one of the user connection port and the SEU of each passenger seat group when the upper connectors are mated with the lower connectors.

25. The system of claim 24, wherein each lower connector is attached to the bottom side of the respective floor panel aligning with an aperture in the respective floor panel such that each lower connector coupling contact is accessible from the top side of the respective floor panel.

26. The system of claim 25, wherein at least a portion of each lower connector extends into each respective aperture.

27. The system of claim 25, wherein the upper connectors are adapted to attach to the top side of the floor panels such that the upper connectors mate with the lower connectors and the upper coupling contacts couple with the lower coupling contacts through the apertures.

28. The system of claim 24, wherein each upper connector includes a flange around an upper edge to provide a barrier against moisture penetrating the mated upper and lower connectors.

29. The system of claim 28, wherein each upper connector includes an o-ring positioned under the flange to further provide a barrier against moisture penetrating the mated upper and lower connectors.

30. The system of claim 24, wherein each lower connector is adapted to:
attach to the bottom side of the respective floor panel such that at least a portion of the lower connector extends into an aperture located along an edge of the respective floor panel; and
mate with the upper connectors at a side of the lower connectors that is coplanar with the edge of the respective floor panels.

31. The system of claim 24, wherein each lower connector is adapted to:
attach to the bottom side of the respective floor panel adjacent an edge of the respective floor panel: and
mate with the upper connectors at a side of each lower connector that is coplanar with the edge of the respective floor panel.

32. The system of claim 24, wherein the electrical signals comprise electrical current for providing electrical power to at least one of the user connection port and the SEU.

33. The system of claim 24, wherein the data signals comprise at least one of electrical data signals and optical data signals.

34. The system of claim 24, wherein the lower connector signal conduits are adapted to form drip loops between the lower connectors to minimize the penetration of moisture into the lower connectors.

35. The system of claim 24, wherein each upper connector includes a moisture seal around an upper conduit access hole in each upper connector to prevent moisture from entering the upper connectors.

36. The system of claim 24, wherein each lower connector includes a moisture seal around a lower conduit access hole in each lower connector to prevent moisture from entering the lower connectors.

37. The system of claim 24, wherein the upper connector signal conduits comprise flat ribbon cables.

38. The system of claim 24, wherein the lower connector signal conduits are substantially permanently linked together.

39. The system of claim 24, wherein the lower connector signal conduits are detachably linked together.

40. A method for providing access to at least one of electrical power and data communications on board a mobile platform, said method comprising:
attaching a lower connector of a lower wiring harness to a mobile platform floor panel, the lower wiring harness being connectable with a second lower wiring harness; and
removably mating an upper connector of an upper wiring harness with the lower connector, the upper wiring harness connectable with a user connection port associated with a passenger seat adjacent a top side of the floor panel to thereby provide a transmission path for at least one of electrical signals and data signals between the lower wiring harness and the user connection port.

* * * * *